United States Patent [19]

Ansite

[11] Patent Number: 4,787,925
[45] Date of Patent: Nov. 29, 1988

[54] GAS FILTER CANISTER HOUSING ASSEMBLY

[75] Inventor: William K. Ansite, Glendale, Calif.

[73] Assignee: Figgie International Inc., Richmond, Va.

[21] Appl. No.: 485,165

[22] Filed: Apr. 15, 1983

[51] Int. Cl.⁴ .............................................. B01D 46/10
[52] U.S. Cl. ...................................... 55/496; 55/502;
55/503; 55/507; 55/509; 55/DIG. 33; 55/DIG. 35; 128/201.25; 128/205.12; 128/205.27
[58] Field of Search ................. 55/493, 496, 502, 503, 55/505, 480, 507, 509, DIG. 31, DIG. 33, DIG. 35; 210/232, 238; 128/205.12, 205.27, 202.16, 206.12, 201.25

[56] References Cited

U.S. PATENT DOCUMENTS

| | | | |
|---|---|---|---|
| 2,145,049 | 1/1939 | Heuberger | 55/503 |
| 2,606,662 | 8/1952 | Dyer | 55/DIG. 31 |
| 2,744,525 | 5/1956 | Whipple | 128/146 |
| 2,853,153 | 9/1958 | Sexton | 55/496 |
| 4,147,631 | 4/1979 | Deines et al. | 210/238 |
| 4,320,755 | 3/1982 | Flint et al. | 128/205.12 |
| 4,419,110 | 12/1983 | Ansite et al. | 55/503 |

FOREIGN PATENT DOCUMENTS 896873 10/1953 Fed. Rep. of Germany ........ 55/505

OTHER PUBLICATIONS

Chemical/Biological Protective Masks for Military Aviation 651-475 Mask and 854-01 Filter Packs, Scott Aviation-Sierra Products, Inc., Sep. 15, 1977.

Primary Examiner—David L. Lacey
Attorney, Agent, or Firm—Christel, Bean & Linihan

[57] ABSTRACT

A gas filter canister housing assembly (20) capable of receiving gas filter canisters (28 or 40) of differing heights. The housing assembly includes first and second housing portions (54, 56) and holding apparatus (60) capable of holding the housing portion together. The first housing portion has a cylindrical extension (70) in which a filter canister may be disposed, and the second housing portion includes a cup-shape end portion (102) and a depending flexible skirt (100) which may be held against the cylindrical portion (70) in various positions of adjustment.

9 Claims, 2 Drawing Sheets

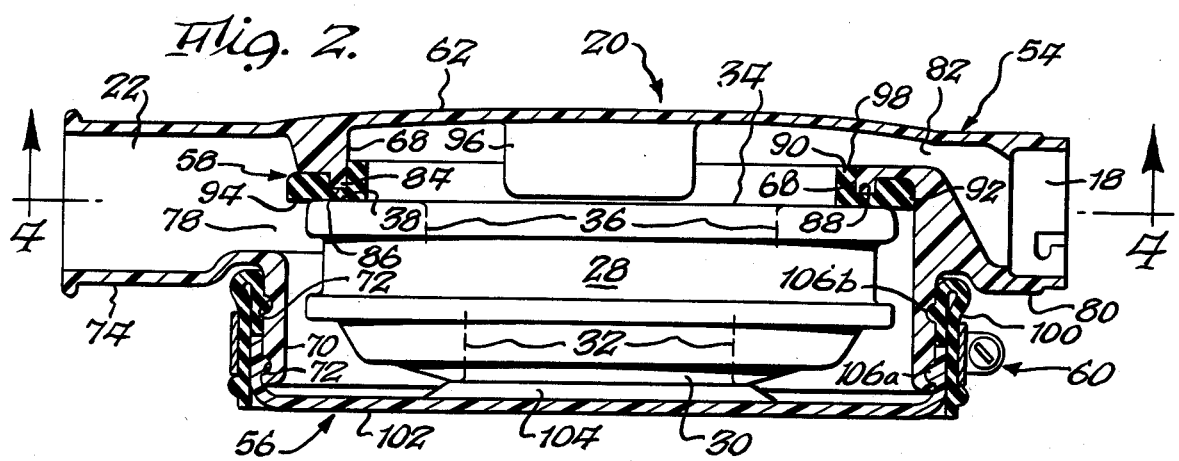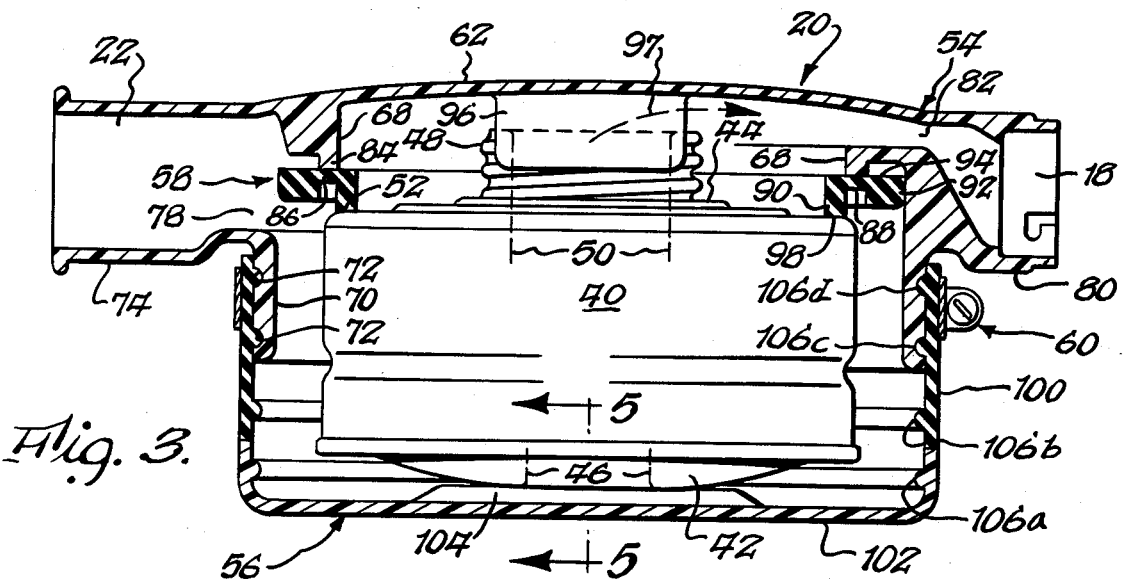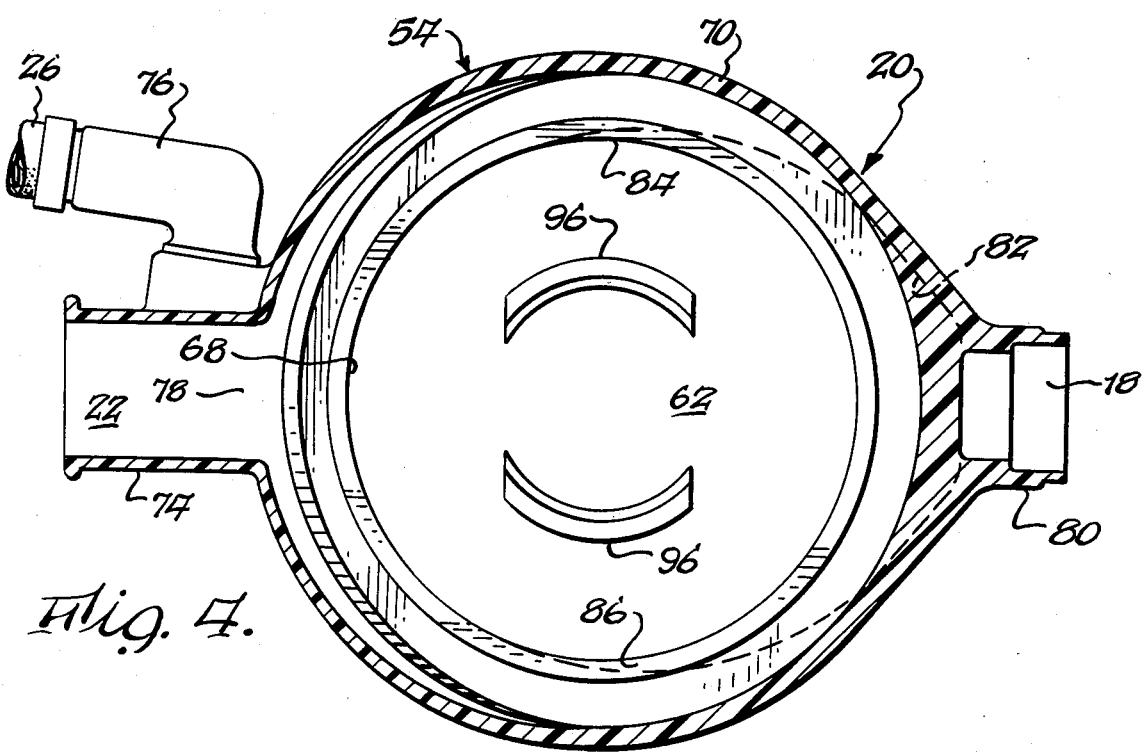

GAS FILTER CANISTER HOUSING ASSEMBLY

FIELD OF THE INVENTION

The present invention relates generally to housing assemblies for gas filter canisters and more particularly to a housing assembly capable of receiving gas filter canisters of approximately the same diameter but of varying heights.

BACKGROUND OF THE INVENTION

In the Armed Forces two differing gas filter canisters have come into relatively widespread usage. Both of these canisters have approximately the same diameter but differing heights. Because of logistical problems one cannot always be assured that a particular gas filter canister will be available for use.

OBJECTS AND SUMMARY OF THE INVENTION

It is an object of the present invention to provide a housing assembly which can accept the gas filter canisters of differing heights.

More specifically, it is an object of the present invention to provide a gas filter canister housing assembly specifically designed for the aircrew of high performance aircraft, which housing assemblies are designed primarily to receive canisters of a minimal height but which can accept canisters of a certain greater height.

In this regard, it should be noted that when an aircrewman ejects from a high performance aircraft it is desirable that the flattest profile be provided for a gas filter canister whereby the negating effects on a crewman's performance and bailout dynamics can be lessened. However, should the need arise to use a canister of a certain greater height, a portion of the housing can be lengthened to accept this greater height canister. The lengthened housing can function as before but, as can be appreciated, will be more bulky and has a greater negative effect on the aircrewman's performance and bailout dynamics.

The above object and other objects and advantages of this invention will become more apparent from a consideration of the following detailed description taken in conjunction with the accompanying drawings in which a preferred form of this invention is illustrated.

BRIEF DESCRIPTION OF THE DRAWINGS

FIG. 2 is a sectional view taken generally along the line 2—2 in FIG. 1 showing a low height canister disposed within the housing assembly of this invention.

FIG. 3 is a view comparable to FIG. 2 but showing the housing assembly in its emergency mode wherein a high height gas filter canister is disposed within the housing assembly.

FIG. 4 is a section taken generally along the line 4—4 in FIG. 2

DETAILED DESCRIPTION OF A PREFERRED EMBODIMENT

Figure 1:
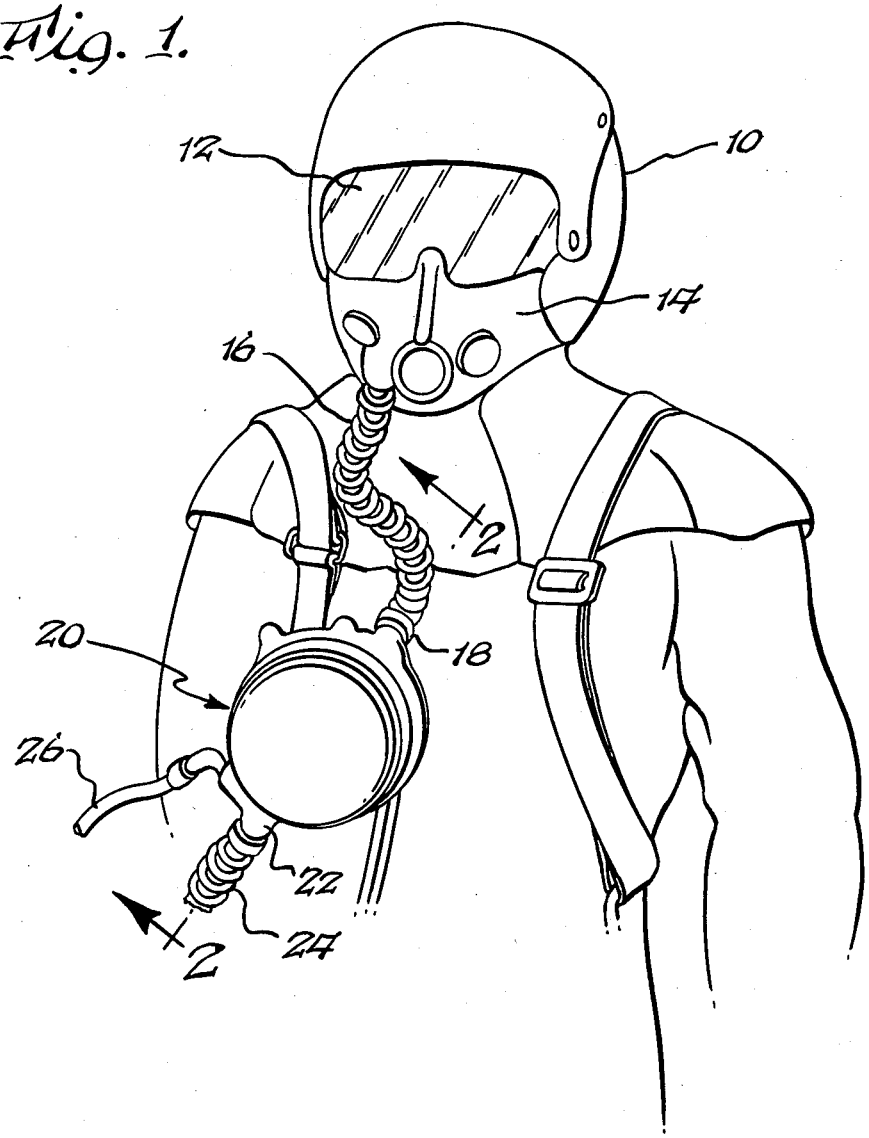
FIG. 1 is a view illustrating the gas filter canister housing assembly of this invention as normally worn by an aircrewman, the housing assembly being illustrated in its normal mode wherein a low height gas filter canister is disposed within the housing assembly.

Referring first to FIG. 1 an aircrewman is indicated wearing high altitude protective gear. This protective gear includes, in addition to the usual suit and harness a helmet 10 provided with a visor 12 and a full face mask 14. In order to protect an aircrewman from potential poisonous gases in the atmosphere the air supply must pass through a filter. To this end, the mask inlet hose 16 is connected to the outlet 18 of a gas filter canister housing assembly indicated generally at 20. The inlet 22 to the gas filter canister housing assembly 20 is in turn connected to a source of air. The source of air can either be the air supply of the aircraft, and to this end the inlet 22 is connected to the aircraft air supply through a connector tube 24 and the inlet 22 is also connected to bottled gas by means of bottled gas tube 26. The overall combination of elements so far described are well known to those skilled in the art and therefore will not be described further.

As the gas filter canister housing assembly of this invention is designed primarily for two differing canisters, which canisters are shown in FIGS. 2 and 3, they will be described first.

The canister shown in FIG. 2 will be referred to as the C-1 canister and has a generally cylindrical wall 28, an inlet end wall 30 of slightly domed configuration, the inlet end wall being provided with an inlet opening indicated by the dotted lines 32. The opposite end wall 34 is provided with an outlet opening indicated by the dotted lines 36. The end wall 34 has a peripheral sealing surface 38. Filtering material is disposed within the canister, which filtering material is capable of filtering out harmful elements from the atmosphere.

In FIG. 3 another form of gas filter canister is shown, which canister will be referred to as the C-2 canister. This canister is also provided with filtering material but because of its larger size has a greater capacity for filtering out harmful elements. This canister also has a generally cylindrical sidewall 40 and spaced apart inlet and outlet end walls 42, 44, respectively. The inlet end wall 42 is of a slightly domed configuration and has an inlet opening indicated by the dotted lines 46. The outlet end wall 44 is provided with a threaded extension 48 provided with the outlet indicated by the dotted lines 50. The C-2 canister is so designed that the threaded extension can normally be threaded into the inlet of a gas mask to cause the end to seal against a gasket surface. However, the design of the C-2 canister is such that the peripheral outer edge 52 can also be utilized as a sealing surface.

The housing assembly of this invention includes four principle elements, these being a first housing portion indicated generally at 54, a second housing portion indicated generally at 56, sealing means indicated generally at 58, and holding means indicated generally at 60 which is capable of holding the various elements referred to above as well as a gas filter canister in the assembled position.

The first housing portion includes an end wall 62, spaced apart inlet and outlets, 22 and 18, respectively, and annular sealing structure 68 and a sidewall portion 70 of generally cylindrical shape, the sidewall portion being open to one side opposite the end wall 62 and being further provided with annular grooves 72. The inlet 22 is provided with a pair of cylindrical portions 74 and 76 to which the connector tube 24 and bottle gas tube 26 may be connected, respectively. It should be noted that the passageway 78 from the inlet 22 to the interior of the housing passes to that side of the annular sealing structure 68 spaced away from the end wall 62. The outlet 18 is also provided with a cylindrical portion 80 to which the mask inlet hose 16 may be connected. The passageway 82 from the interior of the housing to the cylindrical portion 80 is disposed between the annular sealing structure 68 and the end wall 62 as can best be seen in FIGS. 2 and 3. This insures that the sealing structure is operatively disposed between the inlet 22 and the outlet 18. The annular sealing structure 68 is provided with a cylindrical rib 84 having an outer surface 86 (spaced away from the end wall 62) which is suitable for use as a sealing surface.

The sealing means 58 is adapted to contact the annular sealing structure 68 in one of two differing modes. As illustrated in FIGS. 2 and 3, the sealing means is a generally L-shaped member provided with an annular groove 88 at the juncture of legs 90 and 92, the groove being capable of receiving the rib 84 when in one position, FIG. 2. The leg 92 is provided with a surface 94 opposite the groove 88 which may contact the outer sealing surface 86 of rib 84 when the sealing means 58 is disposed in its other position (FIG. 3). In this connection when a C-2 canister is disposed within the housing assembly of this invention, its threaded portion 48 is threaded into two spaced apart threaded lugs 96 with the sealing means in the position shown in FIG. 3 until the surface 52 contacts the end surface 98 of leg 90 to force the surface 94 of the sealing means 58 into contact with the outer surface 86 of the rib 84 of the annular sealing structure 68 and to also form a seal between surface 52 and end surface 98. The sealing means 58 is preferably a relatively firm rubber. In order to insure that the canister C-2 is not turned too far into the housing and cause the threaded portion 48 to bottom out against the end wall 62, thereby blocking the passage of air from within the canister from flowing between the spaced apart threaded lugs 96 as indicated by the broken arrow 97 in FIG. 3, the threaded portion is terminated before this can happen.

Figure 5:
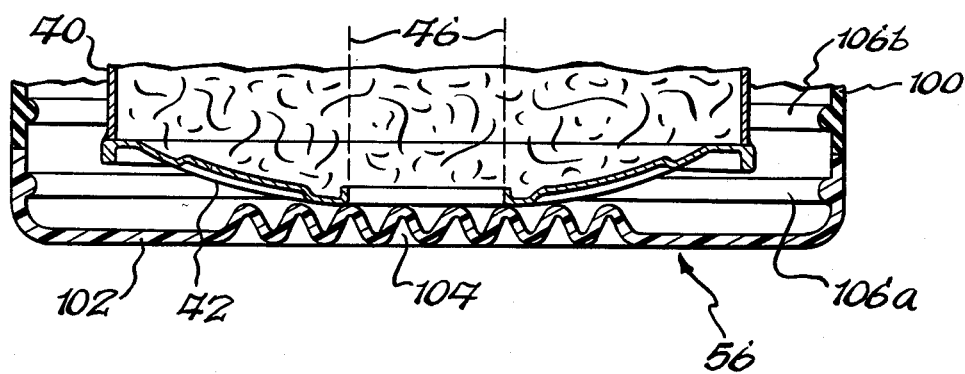
FIG. 5 is a section taken generally along the line 5—5 in FIG. 3.

The second housing portion 56 is provided with a closed end wall member 102 of generally cup-like configuration, an intermediate portion of the end wall member being corrugated as indicated at 104 (FIG. 5), and the end wall member including a cylindrical peripheral edge portion provided with a rib 106a. As can be seen a skirt means 100 extends from the edge of the cylindrical portion of the end wall member 102, the skirt means 100 being secured by a bonded lap joint. The skirt is also provided with a plurality of spaced apart circular ribs 106b, 106c, and 106d which are adapted to be selectively received within grooves 72 in a manner which should be clear from a comparison of FIGS. 2 and 3. The cup-like end wall member 102 is preferably made of plastic and the skirt means 100 is preferably made of silicone rubber. The rib 106a on the end wall member 102 provides a mechanical fastening when the parts are in their FIG. 2 position, the holding means 60 insuring that gases cannot flow between the member 102 and the cylindrical sidewall portion 70. To this end it should be noted that the materials of the end wall member 102 are selected to be impervious to the flow of gases and are also selected to provide that the skirt means 100 has the desired flexibility which is required when adapting the second portion from its normal mode shown in FIG. 2 to its emergency mode shown in FIG. 3. In FIG. 3 the holding means 60 does in fact hold the skirt means 100 to the cylindrical portion 70.

In operation, when the gas filter canister housing assembly of this invention is utilized with a C-1 canister, the sealing means 58 will be disposed in the position illustrated in FIG. 2 and the peripheral sealing surface 38 of the canister will bear against the surface 94 of the sealing means 58, the groove 88 of the sealing means receiving the rib 84 of the annular sealing structure 68. The second housing portion 56 will be disposed in the position illustrated in FIG. 2 with the ribs 106a and 106b being received within the grooves 72 in the manner indicated and a further portion of the skirt means being folded back over the initial portion. The various parts are then held in their assembled position by tightening up the holding means, 60 which is in the form of a clamp with the end wall 102 causing the corrugated portions 104 to bear against the end wall 30 of the canister to hold in its assembled relationship. The corrugated portions additionally act as means to insure the maintenance of an air passage from the inlet 22 of the first housing portion to the inlet of the gas filter canister. Air which then flows into the inlet 22 will pass along the outside of the canister and through the canister inlet 32 and then through the outlet 36 of the canister, and thence to the outlet 18 of the housing assembly. When the housing assembly of this invention is utilized with a C-2 canister, the C-2 canister will be threaded into its assembled position shown in FIG. 3, causing the canister to bear against the sealing means 58 which has been inverted. After the parts have been disposed in this position the second housing portion is then assembled and held in place by the clamp. In this position the second housing portion does not in fact hold the canister in its assembled position but only assures that flow of gases from the inlet 22 will not be contaminated by outside air.

While the preferred structure in which the principles of the present invention have been incorporated is shown and described above, it is to be understood that this intention is not to be limited to the particular details, shown and described above, but that, in fact, widely differing means may be employed in the broader aspects of this invention.

What is claimed is:

1. A gas filter housing assembly adapted to receive gas filter canisters; said housing assembly comprising:
  a first housing portion having an end wall, an outlet adjacent said end wall, an annular sealing structure having a sealing surface spaced away from said end wall, a generally cylindrical side wall portion open to one side opposite said end wall whereby it may receive gas filter canisters of greater and lesser heights but approximately the same width, each of said gas filter canisters including a generally cylindrical side wall portion and spaced apart first and second end walls, there being an inlet in the first end wall and an outlet in the second end wall, said second end wall further being provided with a peripheral sealing surface of a configuration approximately the same as the sealing surface on the first housing portion, and the gas filter canister of greater height having a threaded portion disposable adjacent the outlet and adapted to be utilized to secure the filter canister in its assembled position, at least one annular groove being provided in the exterior surface of said cylindrical side wall portion, an inlet disposed between said sealing surface and said side wall portion, and threaded means attached to said end wall to which the threaded portion of a canister of greater height may be secured;

a second housing portion having a closed end wall of substantially the same diameter as the cylindrical side wall portion and peripheral cylindrically extending skirt means so constructed that it is capable of being folded back upon itself, said skirt means being provided with internal beads which may be selectively secured to said at least one annular groove to position the second housing portion in first and second positions of adjustment, at least the skirt means of said second housing portion being made of flexible material impervious to gas;

sealing means adapted to be disposed between a gas filter canister when disposed within the first and second housing portions to seal the inlet of the first housing portion from said outlet of the first housing portion except when air passes through said gas filter canister; and holding means disposable about said skirt means and capable of holding said skirt means to said side wall portion in one of said positions of adjustment.

2. The gas filter housing assembly as set forth in claim 7 wherein said annular, sealing structure is provided with a cylindrical rib, and said sealing means is provided with a cylindrical recess capable of receiving said cylindrical rib and a cylindrical extension adjacent said rib, said sealing means being adapted to be assembled in one position with the cylindrical rib being received within said cylindrical recess whereby when a canister is disposed adjacent said sealing means it is relatively closely spaced to said end wall of the first housing portion, and said sealing means being adapted to be disposed in another position of assembly wherein said cylindrical rib is not received within said cylindrical recess and said cylindrical extension contacts a gas filter canister to dispose the canister further away from said end wall of the first housing portion.

3. The gas filter housing assembly as set forth in claim 7 wherein said second housing portion is provided with a corrugated surface in said closed end wall portion.

4. A gas filter canister housing assembly capable of receiving gas filter canisters; said gas filter canister housing assembly comprising:

a first housing portion provided with an end wall, an outlet, a sealing surface, and a tubular side wall portion open at one end thereof whereby it may receive gas filter canisters of greater and lesser heights, each gas filter canister having approximately the same width and spaced apart inlet and outlets, and each gas filter canister further being provided with a peripheral sealing surface between the inlet and outlets;

a second housing portion having a closed end wall member of approximately the same width as the tubular side wall portion of the first housing portion, and tubular flexible skirt means extending away from the edge of the end wall member and so constructed that it is capable of being folded back upon itself, said skirt means being disposable about the side wall portion of the first housing portion in first and second positions of adjustment, said skirt means when in said first position of adjustment having a first portion of the skirt means folded back over a second portion of the skirt means whereby a portion of the end wall member may be in contact with the inlet of a gas filter canister of lesser height to maintain it in sealing contact with the sealing surface of the first housing portion when said gas filter canister of lesser height is received within said first and second housing portions, and said skirt means when disposed in said second position of adjustment having said first portion of the skirt means in contact with said side wall portion whereby a gas filter canister of greater height may be received within said first and second housing portions; and holding means disposable about said skirt means and capable of securing said skirt means to said side wall portion in either of said first or second positions of adjustment in an air tight relationship.

5. The gas filter canister housing assembly as set forth in claim 4 further comprising sealing means adapted to be disposed between the sealing surface on the first housing portion and the peripheral sealing surface of the gas filter canisters, said sealing means insuring that an air tight relationship is maintained between the sealing surfaces of a gas filter canister and first housing portion and further providing for differing spacings between the peripheral sealing surface of said gas filter canisters of differing heights and the sealing surface of the first housing portion.

6. The gas filter canister housing assembly as set forth in claim 4 wherein the inlet in the first housing portion is in fluid communication with a passageway between said sealing surface and a side wall portion, said second housing portion being provided with means to insure the maintenance of an air passage from the inlet of the first housing portion to the inlet of a gas filter canister.

7. The gas filter canister housing assembly as set forth in claim 4 wherein said outlet is disposed between said sealing surface and said end wall.

8. A gas filter canister housing assembly capable of receiving gas filter canisters; said gas filter housing assembly comprising:

a first housing portion having an end wall and spaced apart inlet and outlets, a sealing surface spaced away from said end wall, the outlet extending between said sealing surface and the end wall, and a side wall portion open at one end thereof whereby it may receive gas filter canisters of greater and lesser heights but of approximately the same width, each of said gas filter canisters being provided with spaced apart first and second end walls, there being an inlet in the first end wall and an outlet in the second end wall, said second end wall further being provided with a peripheral sealing surface disposed about said outlet, said peripheral sealing surface being of generally the same configuration as the sealing surface of the first housing portion, said side wall portion having a width such that a passageway is established between said side wall portion and a canister when a canister is mounted within the first housing portion, said passageway being for the flow of air from the inlet of the first housing portion to the inlet to a gas filter canister;

a second housing portion adapted to enclose a gas filter canister in association with the first housing portion, said second housing portion including a closed end wall member and skirt means extending from the edge of the closed end wall member, said skirt means being so constructed that it is capable of being folded back upon itself and being adapted to be secured in first and second positions of adjustment about said side wall portion for receiving gas filter canisters of lesser and greater heights, respectively;

sealing means adapted to be disposed between the sealing surface of the first housing portion and the peripheral sealing surface of a gas filter canister to maintain the canister in a sealed relationship with the sealing surface of the first housing portion when the parts are in their assembled position; and holding means disposable about said skirt means and capable of securing the skirt means in said first and second positions of adjustment, the end wall member being capable of bearing against the first end wall of a gas filter canister of lesser height when the parts are in their first position of adjustment to cause the peripheral sealing surface of said gas filter canister of lesser height to be forced against said sealing means to ensure a gastight seal.

9. The gas filter housing assembly as set forth in claim 8 wherein the side wall portion is provided with at least one annular groove on its exterior surface and said skirt means is provided with a plurality of annular beads on its interior surface, which beads are adapted to be selectively received within said at least one annular groove to maintain the skirt means in various positions of adjustment.

* * * * *